United States Patent
Inukonda et al.

(10) Patent No.: US 9,639,515 B2
(45) Date of Patent: May 2, 2017

(54) TRANSFER OF DATA BETWEEN APPLICATIONS USING INTERMEDIATE USER INTERFACE

(71) Applicant: Bank of America Corporation, Charlotte, NC (US)

(72) Inventors: Krishna Inukonda, Hyderabad (IN); Herbert Fernandes, Mumbai (IN); Sainath Salluri, Hyderabad (IN); Lorraine Maria Curran, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 500 days.

(21) Appl. No.: 14/148,917

(22) Filed: Jan. 7, 2014

(65) Prior Publication Data

US 2015/0193123 A1   Jul. 9, 2015

(51) Int. Cl.
| | | |
|---|---|---|
| G06F 17/24 | (2006.01) | |
| G06F 9/54 | (2006.01) | |
| G06F 17/30 | (2006.01) | |
| G06F 3/048 | (2013.01) | |
| G06Q 10/10 | (2012.01) | |

(52) U.S. Cl.
CPC ............ G06F 17/243 (2013.01); G06F 3/048 (2013.01); G06F 9/543 (2013.01); G06F 17/30017 (2013.01); G06Q 10/10 (2013.01)

(58) Field of Classification Search
CPC ............................... G06F 17/243; G06F 9/543
See application file for complete search history.

(56) References Cited

U.S. PATENT DOCUMENTS

| | | | | | |
|---|---|---|---|---|---|
| 5,272,628 | A | * | 12/1993 | Koss | G06F 17/246 715/205 |
| 6,115,723 | A | * | 9/2000 | Fallside | G06F 17/2247 715/210 |
| 6,339,773 | B1 | * | 1/2002 | Rishe | G06F 17/30905 707/722 |
| 7,555,723 | B1 | * | 6/2009 | Coe | G06F 3/0486 715/768 |
| 8,027,953 | B2 | * | 9/2011 | LaRue | G06F 17/30578 707/612 |

(Continued)

*Primary Examiner* — William Bashore
*Assistant Examiner* — Nathan Shrewsbury
(74) *Attorney, Agent, or Firm* — Banner & Witcoff, Ltd.; Michael A. Springs

(57) ABSTRACT

Methods, systems, computer-readable media, and apparatuses for transfer of customer information between a first user interface and a third user interface by way of a second user interface are provided. In some embodiments, customer information may be imported into an intermediate user interface from a text-based user interface based on a first mapping associating portions of the text-based user interface with portions of an intermediate user interface. In some embodiments, the intermediate user interface is associated with a spreadsheet. The imported customer information may be reviewed by a user and accepted. The accepted customer information is used to populate a graphical user interface according to a second mapping associating one or more fields of the graphical user interface with portions of the intermediate user interface. In some embodiments, the graphical user interface is a browser-based user interface.

20 Claims, 11 Drawing Sheets

(56) References Cited

U.S. PATENT DOCUMENTS

| | | | |
|---|---|---|---|
| 8,296,671 B2* | 10/2012 | Narayanan | G06F 9/543 715/764 |
| 9,203,786 B2* | 12/2015 | Ozzie | G06F 17/30578 |
| 2001/0027439 A1* | 10/2001 | Holtzman | G01R 33/50 705/39 |
| 2002/0013788 A1* | 1/2002 | Pennell | G06F 17/243 715/224 |
| 2004/0236796 A1* | 11/2004 | Bhatt | G06F 17/30557 |
| 2005/0066335 A1* | 3/2005 | Aarts | G06F 9/543 719/316 |
| 2005/0251733 A1* | 11/2005 | Elkady | G06F 17/2247 715/209 |
| 2005/0262521 A1* | 11/2005 | Kesavarapu | G06F 9/543 719/320 |
| 2006/0059247 A1* | 3/2006 | Marappan | G06F 17/243 709/219 |
| 2006/0059434 A1* | 3/2006 | Boss | G06F 17/243 715/780 |
| 2006/0161581 A1* | 7/2006 | George | G06F 17/3056 |
| 2007/0250520 A1* | 10/2007 | Dettinger | G06F 17/3089 |
| 2007/0294366 A1* | 12/2007 | Ozzie | G06F 17/30578 709/217 |
| 2008/0109464 A1* | 5/2008 | Ozzie | G06F 9/543 |
| 2008/0109744 A1* | 5/2008 | Ozzie | G06F 9/543 715/770 |
| 2008/0109832 A1* | 5/2008 | Ozzie | G06F 17/24 719/329 |
| 2008/0141136 A1* | 6/2008 | Ozzie | G08B 21/22 715/723 |
| 2008/0195739 A1* | 8/2008 | Ozzie | H04L 29/06 709/228 |
| 2008/0243874 A1* | 10/2008 | Suthar | G06F 17/2247 |
| 2008/0267221 A1* | 10/2008 | Ozzie | G06F 17/30581 370/503 |
| 2008/0270481 A1* | 10/2008 | Augustine | G06F 17/30581 |
| 2011/0271173 A1* | 11/2011 | Ait-Mokhtar | G06F 17/243 715/226 |
| 2011/0282728 A1* | 11/2011 | Bingham | G06Q 30/0201 705/14.36 |
| 2013/0014044 A1* | 1/2013 | Narayanan | G06F 9/543 715/770 |
| 2014/0006129 A1* | 1/2014 | Heath | G06Q 30/0222 705/14.23 |

* cited by examiner

```
File   Edit   Options      Help
```
Welcome to the customer information system, User Name!

--Main Menu--
Please select an option:

1.   View customer by customer ID

2.   View customer by account number

3.   Search for a customer

4.   Create a new customer record

5.   Logoff

```
File   Edit   Options      Help
```
--Customer Information--
Customer ID: ########1
Account Number: $$$$$$$1              ←――211
Last Name: LASTNAME
First Name: FIRSTNAME      Middle Name: MIDDLE
Previous Names: PRELAST, PREFIRST
SSN: AAA-BB-CCCC
Street Address: #### STREET ST
City: CITY       State: STATE     Zip Code: ZIPZI-PZIP
Telephone: (###)###-####

Please select an option:
1.    View account details
2.    View employment details
3.    Main Menu

Data Form Prefill Utility — 401

File  Edit  View  Import  Export  Options  Help

[Import Data]  [Populate Form]

Customer Details | Account Details | Employment — 421

| | | | |
|---|---|---|---|
| Customer ID | ########1 | Account No. | $$$$$$$$1 |
| Last Name | LastName | SSN | AAABBCCCC |
| First Name | FirstName | | |
| Middle Name | Middle | Type | TYPE |
| Prior Names | PreLast, PreFir | Status | STATUS |
| Street Address | #### Street St | | |
| City | City | | |
| State | ST | Zip Code | ZIPZI-PZIP |
| Country | COUNTRY | | |

Data Form Prefill Utility — 402

File  Edit  View  Import  Export  Options  Help

[Import Data]  [Populate Form]

Customer Details | Account Details | Employment — 421

Customer ID [ ]

| | Customer | Related Customer |
|---|---|---|
| Customer ID | ########1 | ########2 |
| Last Name | LastName | LastName2 |
| First Name | FirstName | FirstName2 |
| Middle Name | Middle | Middle2 |
| Prior Names | PreLast, PreFirst | |
| Street Address | #### Street St | ###1 Street St |
| City | City | City |
| State | ST | ST |
| Zip Code | ZIPZI-PZIP | ZIPZI-PZIP |
| Country | COUNTRY | COUNTRY |

211 → , 432

| | A | B | C | D | E | F | G | H |
|---|---|---|---|---|---|---|---|---|
| 1 | CUSTOMER ID | ACCOUNT ID | LAST | FIRST | MIDDLE | STREET | CITY | STATE |
| 2 | ########1 | $$$$$$$1 | LASTNAME | FIRSTNAME | MIDDLE | #### STREET ST | CITY | STATE |
| 3 | ########2 | $$$$$$$2 | LASTNAME2 | FIRSTNAME2 | MIDDLE2 | ###1 STREET ST | CITY | STATE |
| 4 | ########3 | $$$$$$$3 | LASTNAME3 | FIRSTNAME3 | MIDDLE3 | ###2 STREET ST | CITY2 | STATE |
| 5 | ########4 | $$$$$$$4 | LASTNAME4 | FIRSTNAME4 | MIDDLE4 | ###3 ROAD RD | CITY3 | STATE |

```
<customers>
    <customer customerid="########1">
        <accountid>$$$$$$$1</accountid>
        <name>
            <first>FIRSTNAME</first>
            <middle>MIDDLE</middle>
            <last>LASTNAME</last>
        </name>
        <address>
            <street>#### STREET ST</street>
            <city>CITY</city>
            <state>STATE</state>
            <zip>ZIP1-PZIP</zip>
            <country>COUNTRY</country>
        </address>
        ...
    </customer>
    ...
</customers>
```

File  Edit  View  Favorites  Help http://www.#######.com/form

231 — Third Party Form

Customer Details
VendorID  ########1      Account No.  $$$$$$$$1
SSN       AAABBCCCC      Status       STATUS
Name      LastName, FirstName
Street Address  #### Street ST, City ST ZIPZI  ←— 232

Issue Type  AAAA - BBBBBBBBB
Comment     CCCCCCCCCCCC

Cancel    Submit
  612      611

FIG. 6

TRANSFER OF DATA BETWEEN APPLICATIONS USING INTERMEDIATE USER INTERFACE

BACKGROUND

Aspects of the disclosure relate to computer hardware and software. In particular, one or more aspects of the disclosure generally relate to computer hardware and software for transferring data between applications through use of an intermediate user interface.

In modern commerce, customer information is maintained by a diverse array of organizations. Each organization has different systems and standards for storing and accessing customer information. Although there have been attempts to standardize customer information systems, no attempt has succeeded due to the unique needs and capabilities of each organization. Furthermore, different organizations or business units within an organization often upgrade customer information systems at different times, resulting in distinct and different user interfaces and ways of retrieving customer information.

Often, a user of customer information systems will have to use information from one customer information system as input to another customer information system. If the customer information systems are different and have not been designed to work together, the user is forced to manually copy over each item of customer information from one system to the other. This problem is especially prevalent where a legacy text-based system provides an interface to an essential customer information database. Modern forms used to interact with other organizations and business units are frequently web-based forms. In order to transfer information from the legacy text-based system, a user must manually copy each individual item of customer information from the text-based system to the web-based form, one item at a time.

This problem is particularly prevalent in the field of credit reporting. Each major provider of credit reporting services tracks and maintains databases of similar customer information. However, the information is stored differently by each provider. When a customer seeks to dispute information contained in a credit report, a user must retrieve customer information records and manually copy the information over to a dispute resolution form item by item.

SUMMARY

Aspects of the disclosure relate to various systems and techniques that provide automatic and accurate transfer of information from one application to another through use of an intermediate user interface. In particular, some aspects of the disclosure provide ways of transferring customer information from a text-based user interface to a destination user-interface having one or more fields. Some embodiments apply the disclosed techniques in a credit dispute resolution system.

For example, some embodiments discussed in greater detail below provide techniques for transferring customer information from a first user interface to a third user interface by way of a second user interface. In particular, customer information associated with a first customer may be identified in a first user interface. The first user interface may be a text-based user interface. At least a portion of the customer information may be automatically imported into a second user interface according to a first mapping which associates each of one or more portions of the second user interface with a corresponding portion of the first user interface. After the import, user input may be received approving the imported customer information. Responsive to the approval, one or more fields of a third user interface may be populated with the approved customer information according to a second mapping which associates each of the one or more fields with a corresponding portion of the second user interface.

In some embodiments, the first mapping may associate coordinates of the text-based user interface with a respective portion of the second user interface.

In some embodiments, the second user interface may be associated with a spreadsheet, the first mapping may associate each of at least one column of the spreadsheet with a corresponding portion of the text-based user interface, and the second mapping may associate each of the one or more fields with a corresponding column of the spreadsheet. Further, the spreadsheet may comprise a plurality of customer records, each customer record comprising information associated with a respective customer. Additionally or alternatively, the spreadsheet may store additional customer information associated with the first customer.

In some embodiments, the second user interface may be associated with a markup document, the first mapping may associate each of at least one element of the markup document with a corresponding portion of the first user interface, and the second mapping may associate each of the one or more fields of the third user interface with a corresponding element of the markup document.

In some embodiments, the imported customer information may be modified or aggregated prior to populating the one or more fields.

In some embodiments, user input may be received editing a portion of the imported customer information and the customer information may be updated according to the received input.

In some embodiments, a markup document used to generate the third user interface may be parsed in order to populate the one or more fields.

In some embodiments, the second user interface may further comprise a control to initiate the automatic import and a control to initiate the automatic populating.

In some embodiments, a populated form associated with the third user interface may be automatically submitted.

In some embodiments, a form associated with the third user interface may be presented within a credit report dispute resolution system and the form may be populated with approved customer information.

In some embodiments, the first mapping may associate a first portion of the second user interface with more than one portion of the first user interface.

In some embodiments, the second mapping may associate a first field of the third user interface with more than one portion of the second user interface.

By leveraging various aspects of these techniques and/or the other features and functionalities discussed in greater detail below, customer information may be transferred between a text-based user interface and a graphical user interface in more effective, efficient, scalable, and convenient ways. Various embodiments discussed in greater detail below can reduce the amount of time spent copying customer information, as well as time spent reviewing customer information for errors, that might otherwise be consumed performing manual transfer of customer information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A and 3B illustrate an example text-based user interface according to one or more illustrative embodiments;

FIGS. 4A through 4D illustrate an example intermediate user interface according to one or more illustrative embodiments;

FIGS. 5A and 5B illustrate an example of intermediate data which may be associated with an intermediate user interface according to one or more illustrative embodiments;

FIG. 6 illustrates an example of a graphical user interface according to one or more illustrative embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to transferring data between applications through use of an intermediate user interface. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
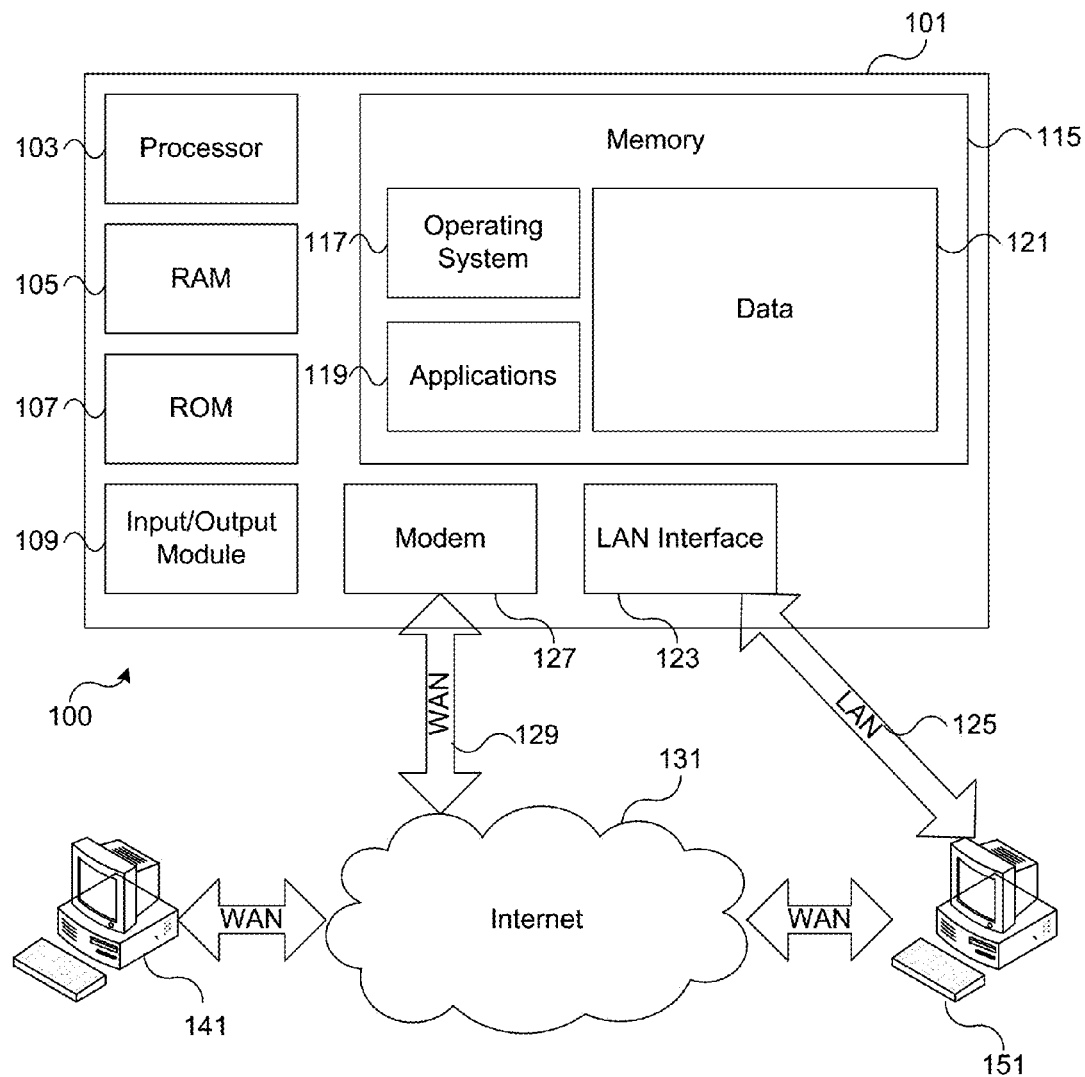
FIG. 1A illustrates an example operating environment in which various illustrative aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
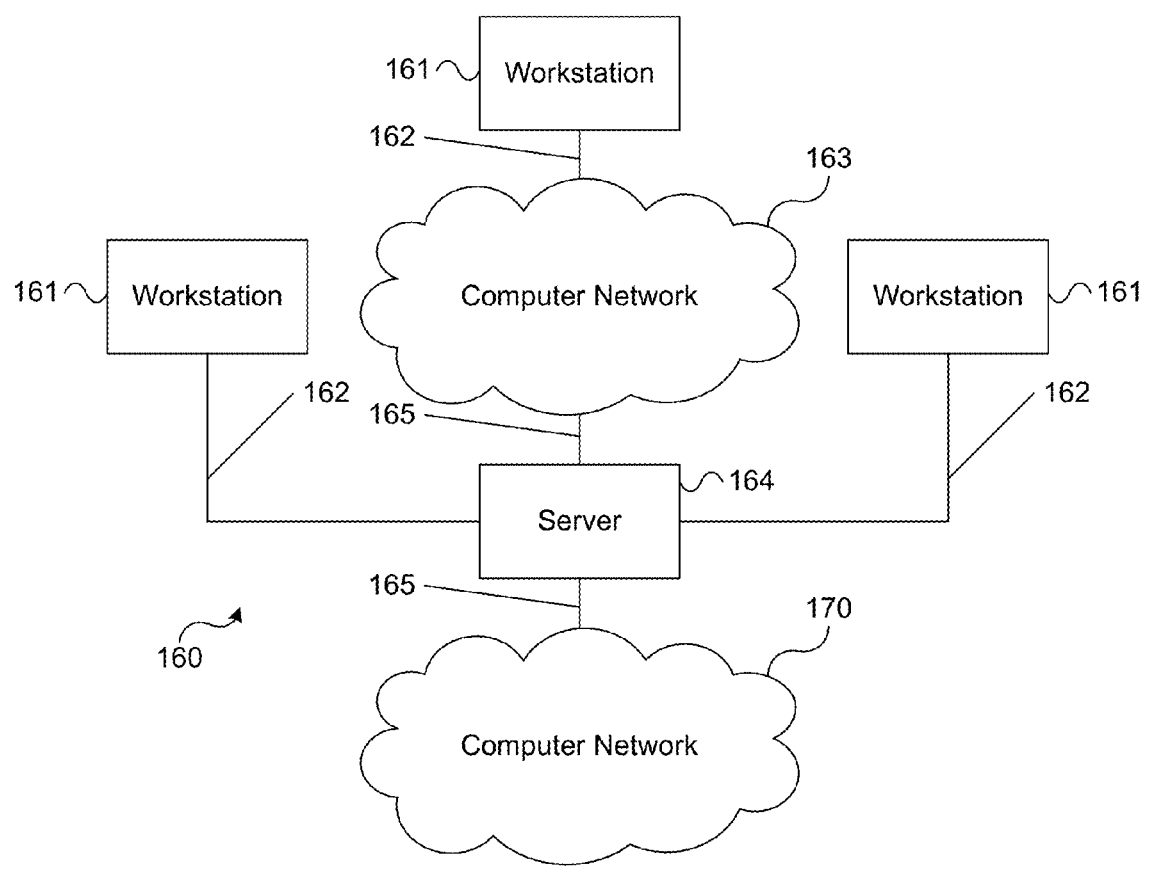
FIG. 1B illustrates another example operating environment in which various illustrative aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hardwired links, and/or the like.

Having described an example of a computing device that can be used in implementing various aspects of the disclosure and an operating environment in which various aspects of the disclosure can be implemented, several embodiments will now be discussed in greater detail.

As introduced above, some aspects of the disclosure generally relate to transferring data using an intermediate user interface. In the discussion below, various examples illustrating how data may be transferred between applications in accordance with one or more embodiments will be provided.

Figure 2:
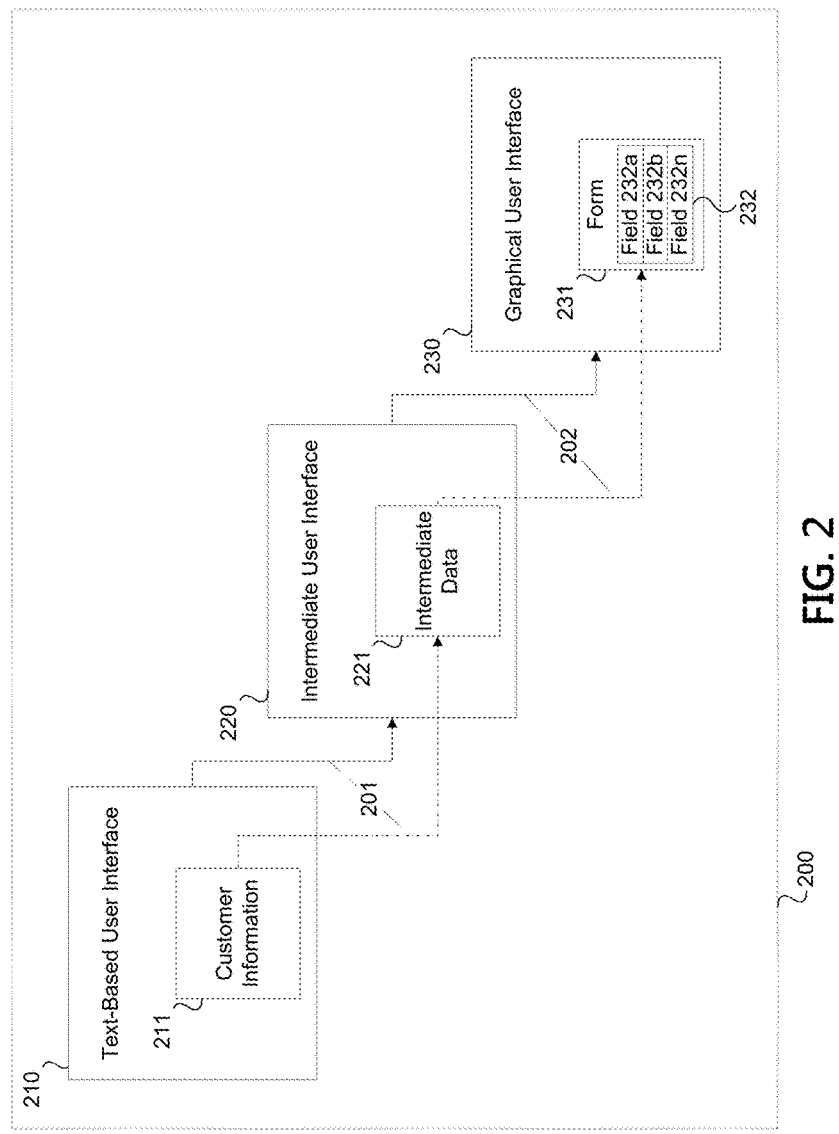
FIG. 2 illustrates an example system with a flow of data between user interfaces according to one or more illustrative embodiments.

FIG. 2 illustrates an example of a system 200 for transferring data between applications using an intermediate user interface according to one or more embodiments. In some embodiments, system 200 may be implemented in one or more computing devices, which may include and/or incorporate one or more processors, one or more memories, and/or one or more aspects of the computing device 101 discussed above. In some instances, system 200 may include a number of different subsystems, modules, databases, and/or libraries. In some arrangements, all of the subsystems or modules included in system 200 may be included in and/or incorporated into a single computing device, while in other arrangements, each subsystem or module included in system 200 (and/or combinations thereof) may be included in and/or incorporated into a distinct and/or dedicated computing device. In addition, each of the databases and/or libraries included in system 200 may be included in and/or incorporated into the same computing device as one or more other subsystems of system 200, or, in other arrangements, may be included in and/or incorporated into distinct and/or dedicated computing devices (which, e.g., are communicatively coupled to and/or otherwise accessible to system 200 and/or its various subsystems).

Further illustrated in FIG. 2 is a flow of data between user interfaces according to one or more embodiments. Data in system 200 flows from text-based user interface 210 to graphical user interface 230 by way of intermediate user interface 220. In some embodiments, the data is customer information 211 and is used to populate one or more of fields 232a, 232b, . . . , 232n, collectively fields 232, of form 231. First mapping 201 may be used to associate portions of text-based user interface 210 with portions of intermediate user interface 220. Second mapping 202 may be used to associate portions of intermediate user interface 220 with graphical user interface 230. In some embodiments, first mapping 201 may associate portions of customer information 211 with portions of intermediate data 221, and second mapping 202 may associate portions of intermediate data 221 with one or more fields 232 of form 231.

Customer information 211 may be available through text-based user interface 210. As used herein, the term "customer" is not intended to be limited to persons or entities having a customer relationship with the provider of the system. Rather, a customer may be any person or entity about which customer information 211 is provided. Customer information 211 may include one or more information items used to identify a person, entity, or attributes thereof. For example, when used as part of a credit report dispute resolution system, customer information 211 may include information items such as first name, last name, middle name, previous names, generation code, social security number, street address, city, state, zip code, telephone number, date of birth, an Equal Credit Opportunity Act (ECOA) code, taxpayer identification number, account number, order number, and/or any other information used to identify a persons or entity or their attributes. Customer information 211 may include account information, credit information, employment information, and/or any other information items related to the customer. Account information may include information items such as loan type, A/C status, account comments, account status, payment rating, account number, special comment, compliance conditions, portfolio type, account type, interest type indicator, terms duration, terms frequency, date opened, date of last payment, first date of delinquency, date of account information, date closed, and the like. Employment information may include information items such as employer name, occupation, employer street address, employer city, employer state, employer zip code, and the like. Other customer information items may include purchased portfolio information, special payment information, mortgage information, original creditor information, and the like.

Methods according to some embodiments of the invention transfer data from a first user interface to a third user interface by way of a second user interface. In some embodiments, the first user interface may be text-based user interface 210. A text-based user interface is a user interface that utilizes characters, symbols, and colors to present a user interface in a character-based terminal or console. A text-based user interface is understood in contrast to a graphical user interface which presents a more user friendly interface through use of graphical icons, windows, folders, desktops, images, and/or other drawing features. A text-based user interface may be, for example, a terminal user interface or a command line user interface. A text-based user interface may be compliant with one or more standards for text based user-interfaces, such as ANSI X3.64, or may be built on top of a framework for text-based interfaces such as Win32 Console, part of the WINDOWS operating system offered by Microsoft Corporation of Redmond, Wash. The text-based user interface may present information stored locally or accessed remotely, such as information stored in a database accessible over a network. The text-based user interface may be a remote terminal for accessing an application executing elsewhere on a network. Text-based user interface 210 may provide customer information 211 which may be stored on a computer providing text-based user interface 210 or otherwise available on a network in which the computer participates.

FIGS. 3A and 3B show an example of text-based user interface 210. FIG. 3A shows an illustrative main menu of text-based user interface 210, which may be a user interface for a customer information system. Text-based user interface 210 provides text based navigation, allowing a user to access data stored in the customer information system. A user may access information stored in the customer information system using options provided in the main menu, such as by specifying one or more attributes of a record or by performing a search. FIG. 3B shows an illustrative display of customer information 211 that has been retrieved from a customer information system. As can be seen in FIG. 3B, customer information 211 may include customer ID, account number, last name, first name, middle name, previous names, social security number, street address, city, state, zip code, and telephone number. However, the customer information listed in FIG. 3B is merely illustrative and customer information 211 may comprise any information used to identify a person, entity, or attributes thereof.

Methods according to some embodiments may comprise using a second user interface to transfer data from the first user interface to the third user interface. The second user interface may be intermediate user interface 220 (FIG. 2). Intermediate user interface 220 may comprise any suitable user interface for displaying customer information 211 which, in some embodiments, has been imported from text-based user interface 210. Intermediate user interface 220 may be a graphical user interface adapted to display customer information imported from text-based user interface 210.

Figures 4A, 4B:
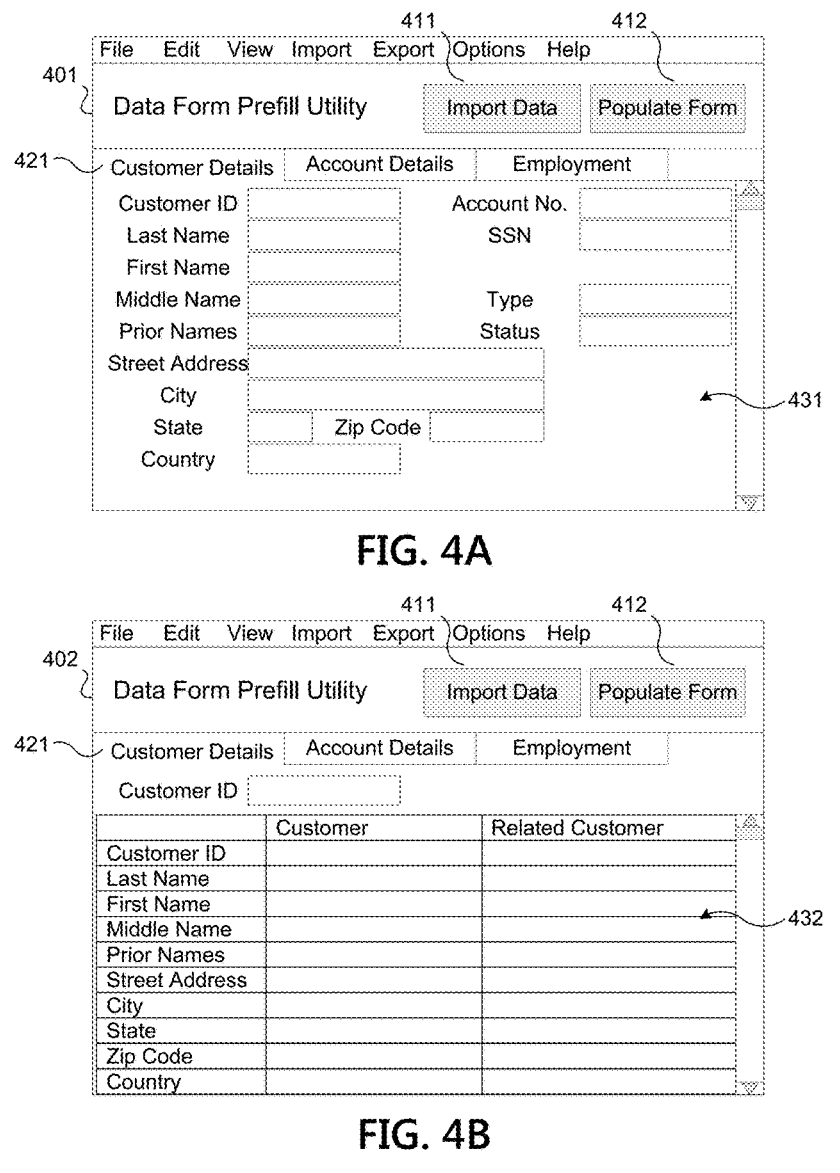

FIGS. 4A and 4B illustrate examples of intermediate user interface 220. As shown in FIGS. 4A and 4B, intermediate user interface 220 may utilize a field-based layout 401 or a table-based layout 402. Other layouts known in the art for the presentation of information may be implemented in other embodiments. In both field-based layout 401 and table-based layout 402, intermediate user interface 220 may comprise navigation tabs 421. Navigation tabs 421 may group customer details, account details, and employment information into logical categories and enable a user to quickly access a particular information item. Intermediate user interface 220 may further comprise import data control 411 and populate form control 412, as illustrated in field-based layout 401 and table-based layout 402. Import data control 411 may be operative to initiate an import of customer information 211 from text-based user interface 210 into intermediate user interface 220, which may be implemented using field-based layout 401 or table-based layout 402. Populate form control 412 may be operative to initiate an export of customer information 211 from intermediate user interface 220 to graphical user interface 230. The import and export of customer information 211 according to embodiments is discussed further below in regard to FIGS. 7 and 8.

In some embodiments, intermediate user interface may contain additional controls such as select source control and select destination control (not shown). Select source control may prompt a user to select a data source or other application as the first user interface. Select source control may further determine an appropriate first mapping in order to import customer information from the selected data source to intermediate user interface 220. Select destination control may prompt a user to select a destination application or web site as the graphical user interface 230. Select destination control may further determine an appropriate second mapping in order to populate fields of the selected destination with imported customer information 211 from intermediate interface 220.

FIG. 4C illustrates an illustrative embodiment of intermediate user interface 220 utilizing field-based layout 401 to display customer information 211 that has been imported from text-based user interface 210 in response to operation of import data control 411. Fields 431 contain portions of imported customer information 211.

FIG. 4D illustrates an illustrative embodiment of intermediate user interface 220 utilizing a table-based layout 402. Table 432 contains customer information 211 as well as additional customer information corresponding to a related customer. Embodiments may provide customer information related to more than one customer, and the related information may be transferred to a third user interface 230 according to the methods disclosed herein.

Intermediate user interface 220 may allow a user to review imported customer information 211 to ensure its accuracy and to make any necessary changes. For example, fields 431 of field-based layout 401 could be editable text fields containing portions of imported customer information 211. A user may review the information contained in fields 431 and edit the text as appropriate. For example, a user may correct a misspelled name or any errors during the import of customer information 211. Similarly, cells of table 432 may be editable by a user to make corrections to the customer information 211 contained therein. Other editing techniques may be utilized to enable a user to correct imported customer information 211, such as user prompts, dialogs, spell checking, automatic comparison to other sources of customer information, and the like.

Intermediate user interface 220 may be associated with intermediate data 221. Intermediate data 221 may be a data structure or file storing imported customer information 211. In some embodiments, imported customer information 211 may be stored in intermediate data 221 and then used to construct intermediate user interface 220. In other embodiments, imported customer information 211 may be stored in intermediate data 221 before export to graphical user interface 230. Corrections made to imported customer information 211 made using intermediate user interface 220 may be communicated to and stored within intermediate data 211. Intermediate data 221 may store information relating to more than one customer, and may contain customer information from other sources besides text-based user interface 210. Intermediate data 221 may be a temporary file, existing during operation of intermediate user interface 220, or it may be a permanent file, persisting even after operation of intermediate user interface 220 ceases. In some embodiments, intermediate data 221 may be created by intermediate user interface 220. Intermediate user interface 220 may directly access data stored in intermediate data 221 or may utilize functions associated with intermediate data 221 to access data stored therein.

In some embodiments, intermediate data 221 may be a spreadsheet. FIG. 5A illustrates a portion of an exemplary spreadsheet 501 having stored therein customer information records relating to multiple customers. Spreadsheet 501 may contain a different row for each customer information record. Spreadsheet 501 may contain a header row which identifies the type of information contained in each column. In some embodiments, intermediate user interface 220 may be generated by a spreadsheet application program associated with spreadsheet 501. In such a case, intermediate user interface 220 may be generated using a scripting language associated with the spreadsheet application. In other embodiments, intermediate user interface 220 may utilize system or application APIs to access spreadsheet 501.

In other embodiments, intermediate data 221 may be a markup language document. FIG. 5B illustrates a portion of an illustrative markup document 502 having stored therein customer information records relating to multiple customers. Markup document 502 may be an Extensible Markup Language (XML) document. Markup document 502 may utilize a hierarchical tag structure to define a customer information record and the associated data. Markup document 502 may be associated with a schema which defines a specific tag structure for customer information records stored therein.

Methods according to some embodiments transfer data to a third user interface from a first user-interface by way of a second user interface. The third user interface may be graphical user interface 230 (FIG. 2). Graphical user interface 230 may provide a form 231. Form 231 may be made up of fields 232a-n, collectively fields 232. Through form 231, graphical user interface 230 may provide access to a remote database or external customer information system. In some embodiments, graphical user interface 230 may be presented by an application associated with form 231. In some embodiments, graphical user interface 230 may be a user interface generated from a markup language document. For example, the markup language document may be a Hypertext Markup Language (HTML) document. In some embodiments graphical user interface 230 may be a browser-based user interface presented in a web browser. However, browser-based user interface need not be presented in a web browser. As used herein, browser-based user interface is intended to cover both user interfaces presented in a web browser as well as web-based user interfaces implemented outside of a web browser but rendered from a markup language document. For example, a web-based user interface may be generated from a markup language document in a custom application program, rather than a web browser. In some embodiments, graphical user interface 230 is a credit report dispute resolution system and form 231 is a credit report dispute form.

FIG. 6 illustrates an illustrative embodiment of graphical user interface 230, which in some embodiments may be browser-based user interface 601. Browser-based user interface may present a web page located at a third party website. The web page located at the third party website may be available over the internet and addressable by a uniform resource locator (URL). The third party website may be accessed using any appropriate protocol including HTTP and HTTPS. Browser-based user interface 601 may comprise form 231 which may be made up of fields 232. Browser-based user interface 601 may further comprise submit control 611 and cancel control 612. Submit control 611 may be operative to submit information contained in fields 232 to a server or other system associated with form 231. Cancel control 612 may discard any information contained in fields 232 and reset the form or return the user to a different web page. Although FIG. 6 illustrates the browser-based user interface 601 as a web page from a third party website, in other embodiments browser-based user interface 601 may be a website provided by an organization of the user (a first party website), a local website, an intranet website, a custom application for accessing form 231, or any web-based user interface for processing customer information. Graphical user interface 230 may be a browser-based user interface such as browser-based user interface 601 in some embodiments, and in others graphical user interface 230 may be any appropriate graphical user interface for processing or receiving customer information.

Figure 7:
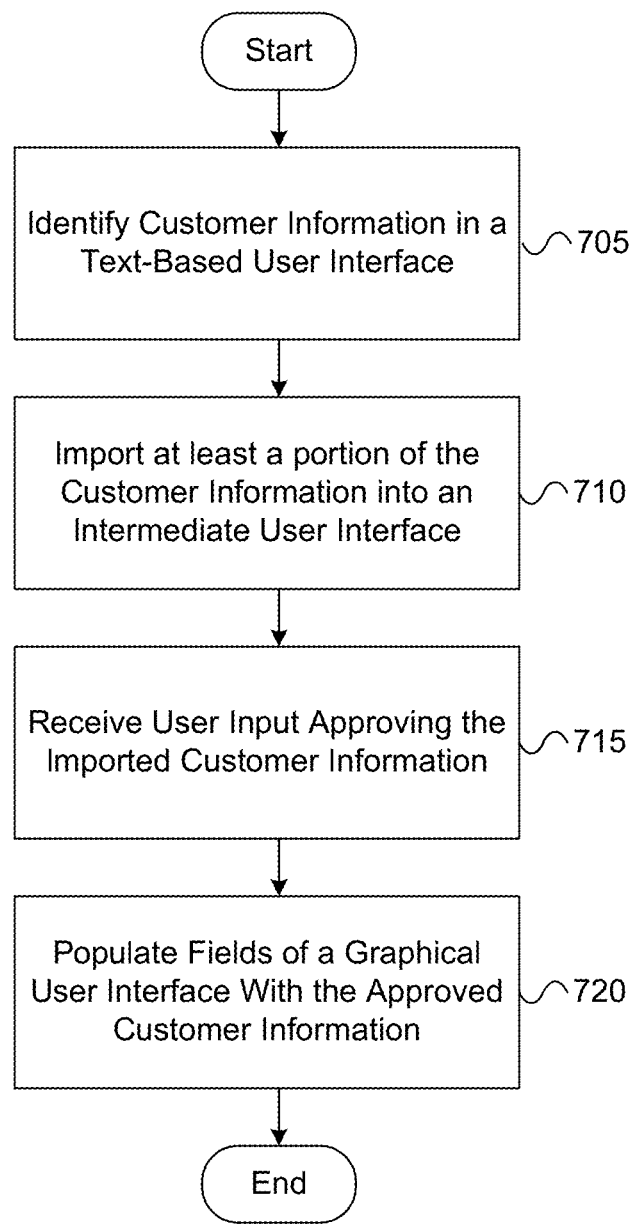
FIG. 7 illustrates an example process flow according to one or more illustrative embodiments.

Having described illustrative user interfaces that may be used in a method of transferring data from a first user interface to a third user interface by way of an intermediate user interface, an example of such a method will now be discussed in greater detail with respect to FIG. 7. FIG. 7 illustrates a flowchart that depicts a method of transferring data from a first user interface to a third user interface by way of a second user interface.

In some embodiments, the example method illustrated in FIG. 7 may be performed by one or more computing devices, which may include and/or implement one or more aspects of computing device 101. In additional and/or alternative embodiments, the example method illustrated in FIG. 7 may be performed by a computer system, such as system 200. In other embodiments, the example method illustrated in FIG. 7 may be implemented in and/or may otherwise be embodied in computer-readable instructions that may be stored in a computer-readable medium, such as a memory.

In step 705, customer information is identified in a first user interface. The first user interface may be, for example, text-based user interface 210. The first user interface may be provided by a local machine implementing the method or by a remote machine to which the local machine has access. The first user interface may be provided in a window, or it may be full screen. The first user interface may be visible to the user, or it may be hidden, minimized, or otherwise occluded. In some embodiments, step 705 may include initializing the first user interface. Initializing the first user interface may comprise opening an application associated with the first user interface and logging in to said application. Step 705 may further comprise receiving an indication of the customer information being sought, such as a particular customer ID, account number, name, or other criteria related to the customer information.

In step 710, at least a portion of the customer information is imported into a second user interface. The second user interface may be, for example, intermediate user interface 220. Step 710 may be preceded by or may include a step of initiating the import in response to operation of an import data control presented by the second user interface, such as import data control 411. The customer information may be automatically imported according to a first mapping 201. First mapping 201 may associate each of one or more portions of the second user interface with a corresponding portion of the first user interface.

For example, first mapping 201 may associate portions of text-based user interface 210 with portions of intermediate user interface 220. In some embodiments, first mapping 201 may identify portions of text-based user interface 210 using a referential coordinate system. The coordinate system may allow the mapping to identify a particular location on the text-based user interface 210, such as by using (x,y) coordinate pairs. In other embodiments, the coordinate system may use rows and columns of a display region of the text-based user interface. The mapping may further utilize a text run length, specifying how many characters to retrieve starting from a specified location. In some embodiments, customer information 211 may be extracted from text-based user interface 210 using screen scraping techniques which capture information available on a user interface. In other embodiments, customer information 211 may be extracted using OCR techniques based on image captures of text-based user interface 210. In still other embodiments, customer information 211 may be extracted using application APIs, system APIs, or other related functions. In addition to or as an alternate embodiment, the mapping may utilize key words or tokens for locating the mapped portion of the text-based user interface 210. For example, the mapping may indicate that a portion of the customer information begins with "CustomerID" and use this to identify the mapped portion of the text-based user interface 210. Additionally or alternatively, first mapping 201 may include additional instructions to access portions of customer information 211, such as instructions to cause text-based user interface 210 to present a different page or retrieve additional customer information. In some embodiments, the additional instructions may comprise virtual keystrokes corresponding to commands of text-based user interface 210.

Each portion of text-based user interface 210 identified in first mapping 201 may be associated with a portion of intermediate user interface 220. In some embodiments where the intermediate user interface 220 utilizes field-based layout 401, first mapping 201 may identify fields 431 of the intermediate user interface 220 which correspond to a mapped portion of the text-based user interface 210. In other embodiments where the intermediate user interface 220 utilizes table-based layout 402, first mapping 201 may identify a cell of table 432.

In some embodiments, intermediate user interface 220 may be associated with intermediate data 221. Intermediate data 221 may be, for example, a spreadsheet such as spreadsheet 501. First mapping 201 may further associate portions of text-based user interface 210 with portions of intermediate data 221. Where intermediate data 221 is implemented as a spreadsheet, first mapping 201 may identify a row, column, or cell of the spreadsheet to be associated with the corresponding portion of text-based user interface 210. First mapping 201 may further utilize a lookup table to identify the proper portion of the spreadsheet corresponding to the portion of text-based user interface 210. In other embodiments, intermediate data 221 may be, for example, a markup language document such as markup language document 502. In such a case, first mapping 201 may associate an element of the markup language document with a corresponding portion of text-based user interface 210. In some embodiments, first mapping 201 may identify the element according to a hierarchical structure of the markup language document including parent and grandparent tags or elements. The hierarchical structure may be defined according to a schema associated with the markup language document.

In some embodiments, first mapping 201 may associate more than one portion of text-based user interface 210 with a particular portion of intermediate user interface 220. Additionally or alternatively, first mapping 201 may associate more than one portion of intermediate user interface 220 with a particular portion of text-based user interface 210. Further, first mapping 201 may incorporate logic to split, concatenate, remove special characters, or otherwise modify customer information 211. For example, text-based user interface 210 may contain a field "Full Name" which is parsed, split, and mapped to both "First Name" and "Last Name" in intermediate interface 220.

In step 715, the method receives user input approving the imported customer information 211. Step 715 may include presenting intermediate user interface 220 containing imported customer information 211 to the user for review. In some embodiments, the intermediate user interface is updated to include the imported customer information 211 from intermediate data 221. As part of step 715, a user may be provided a display of the imported customer information 211 for review and correction. If a user identifies any mistakes in the data or otherwise wishes to make modifications, the user may edit the imported customer information 211. In some embodiments, the edits to the imported customer information 211 may be communicated to and stored in intermediate data 221. The user approves or validates the edited customer information 211 which is then used to populate the third user interface in step 720. In some embodiments, the user indicates approval of the edited customer information 211 by operating a populate form control 412. Some embodiments may omit step 715, and in others the user's approval may be implicit based on user preferences or settings.

In step 720, the third user interface is populated using the approved customer information 211. The third user interface may be, for example, graphical user interface 230. Step 720 may be performed in response to receiving user input approving the customer information 211, such as through operation of populate form control 412. The approved customer information 211 may be used to automatically populate a form 231 presented by graphical user interface 230 according to a second mapping 202. Second mapping 202 may associate each of one or more portions of the third user interface with a corresponding portion of the second user interface. In some embodiments, second mapping 202 may associate each of one or more fields 232 of graphical user interface 230 with a corresponding portion of the second user interface. In some embodiments, the populated form 231 may be automatically submitted on behalf of the user. This may be accomplished by programmatically operating submit control 611.

In some embodiments, second mapping 201 may specify fields 232 of form 231 by a tag name or other ID used to identify a particular field. In some embodiments, a markup language document associated with graphical user interface 230 may be parsed to identify elements corresponding to the specified field. For example, as part of step 720 a markup language document may be parsed to identify a field with an ID of "CustomerID". In other embodiments, APIs or other functions provided by an application associated with graphical user interface 230 may be used to identify a particular field. Second mapping 201 may specify the appropriate functions to call or arguments to be used to identify a particular field. In other embodiments, column headers or other identifiers associated with imported customer data 211 may be used to automatically locate the corresponding field in graphical user interface 230.

In some embodiments, second mapping 202 may associate portions of intermediate data 221 with fields 231, similar to first mapping 201. Where intermediate data 221 is implemented as a spreadsheet, second mapping 202 may identify a row, column, or cell of the spreadsheet to be associated with one or more corresponding fields 232 of graphical user interface 230. For example, a "CustomerID" column in spreadsheet 501 may be mapped to a field having an ID tag "CustomerID". Second mapping 202 may further utilize a lookup table to identify the proper portion of the spreadsheet corresponding to field 232 of graphical user interface 230. In other embodiments, intermediate data 221 may be, for example, a markup language document such as markup language document 502. In such a case, second mapping 202 may associate an element of the markup language document with a corresponding portion of graphical user interface 230. In some embodiments, second mapping 202 may identify the element according to a hierarchical structure of the markup language document including parent and grandparent tags or elements. The hierarchical structure may be defined according to a schema associated with the markup language document.

In some embodiments, second mapping 202 may associate more than one portion of intermediate user interface 220 with a particular portion of graphical user interface 230. Additionally or alternatively, second mapping 202 may associate more than one portion of graphical user interface 230 with a particular portion of intermediate user interface 220. Further, second mapping 202 may incorporate logic to split, concatenate, remove special characters, or otherwise modify imported customer information 211. For example, intermediate user interface 220 may contain fields "First Name" and "Last Name" which are parsed, concatenated, and mapped to "Full Name" in graphical user interface 230.

Figure 8:
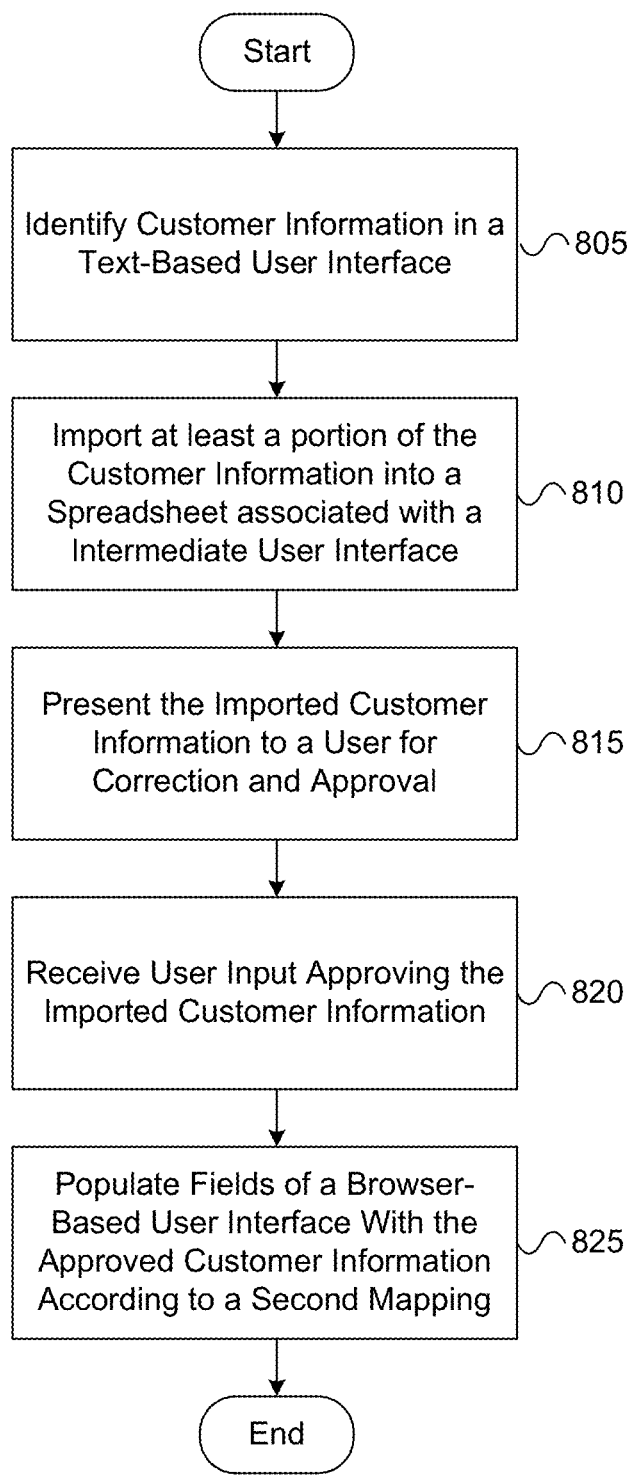
FIG. 8 illustrates another example process flow according to one or more illustrative embodiments.

FIG. 8 illustrates a flowchart presenting an embodiment of the method illustrated in FIG. 7. In some embodiments, the example method illustrated in FIG. 8 may be performed by one or more computing devices, which may include and/or implement one or more aspects of computing device 101. In additional and/or alternative embodiments, the example method illustrated in FIG. 8 may be performed by a computer system, such as system 200. In other embodiments, the example method illustrated in FIG. 8 may be implemented in and/or may otherwise be embodied in computer-readable instructions that may be stored in a computer-readable medium, such as a memory.

In step 805, customer information 211 is identified in a text-based user interface 210. As discussed above in regard to step 705, text-based user interface 210 may be provided in a window, or it may be full screen. Text-based user interface 210 may be visible to the user, or it may be hidden, minimized, or otherwise occluded. Text-based user interface 210 may be initialized, such as by opening an application associated with text-based user interface 210 and logging in to said application. Step 805 may further comprise a user providing an indication of the customer information being sought, such as a customer ID, account number, name, or other criteria related to customer information 211.

In step 810, at least a portion of customer information 211 is imported into a spreadsheet associated with intermediate user interface 220. Step 810 may be preceded by or may include a step of initiating the import in response to operation of an import data control presented by intermediate user interface 220, such as import data control 411. Customer information 211 may be automatically imported according to a first mapping 201. First mapping 201 may associate each of one or more portions of the spreadsheet with a corresponding portion of text-based user interface 210. As discussed above in regard to step 710, first mapping 201 may utilize a referential coordinate system or key terms to identify portions of text-based user interface 210. Each portion of text-based user interface 210 identified in first mapping 201 may be associated with a portion of the spreadsheet. First mapping 201 may identify a row, column, or cell of the spreadsheet to be associated with the corresponding portion of text-based user interface 210. First mapping 201 may further utilize a lookup table to identify the proper portion of the spreadsheet corresponding to the portion of text-based user interface 210.

In step 815, the method presents imported customer information 211 to a user for correction and approval. Imported customer information 211 stored in the spreadsheet may be used to generate a display of imported customer information 211 in intermediate user interface 220. If a user identifies any mistakes in the data or otherwise wishes to make modifications, the user may edit imported customer information 211. In some embodiments, the edits to imported customer information 211 may be communicated to and stored in the spreadsheet.

In step 820, user input is received approving or validating the edited customer information 211. In some embodiments, the user indicates approval of the edited data by operating a populate form control 412. In some embodiments, the user's approval may be implicit based on user preferences or settings.

In step 825, a browser-based user interface is populated using the approved customer information 211. As noted above, in some embodiments graphical user interface 230 may be implemented as a browser-based user interface, such as illustrative browser-based user interface 601. The approved customer information may be used to automatically populate a form 231 presented by browser-based user interface 601 according to a second mapping 202. Second mapping 202 may associate each of one or more portions of browser-based user interface 601 with a corresponding portion of intermediate user interface 220. In some embodiments, second mapping 202 may associate each of one or more fields 232 of browser-based user interface 601 with a corresponding portion of the spreadsheet, as discussed above in regard to step 720. In some embodiments, second mapping 202 may specify fields 232 of form 231 by a tag name or other ID used to identify a particular field. A markup language document associated with browser-based user interface 601 may be parsed to identify elements corresponding to the specified field. Second mapping 202 may identify a row, column, or cell of the spreadsheet to be associated with one or more corresponding fields 232 of browser-based user interface 601. For example, a "CustomerID" column in spreadsheet 501 may be mapped to a field having an ID tag "CustomerID". Second mapping 202 may further utilize a lookup table to identify the proper portion of the spreadsheet corresponding to field 232 of browser-based user interface 601.

Figure 9:
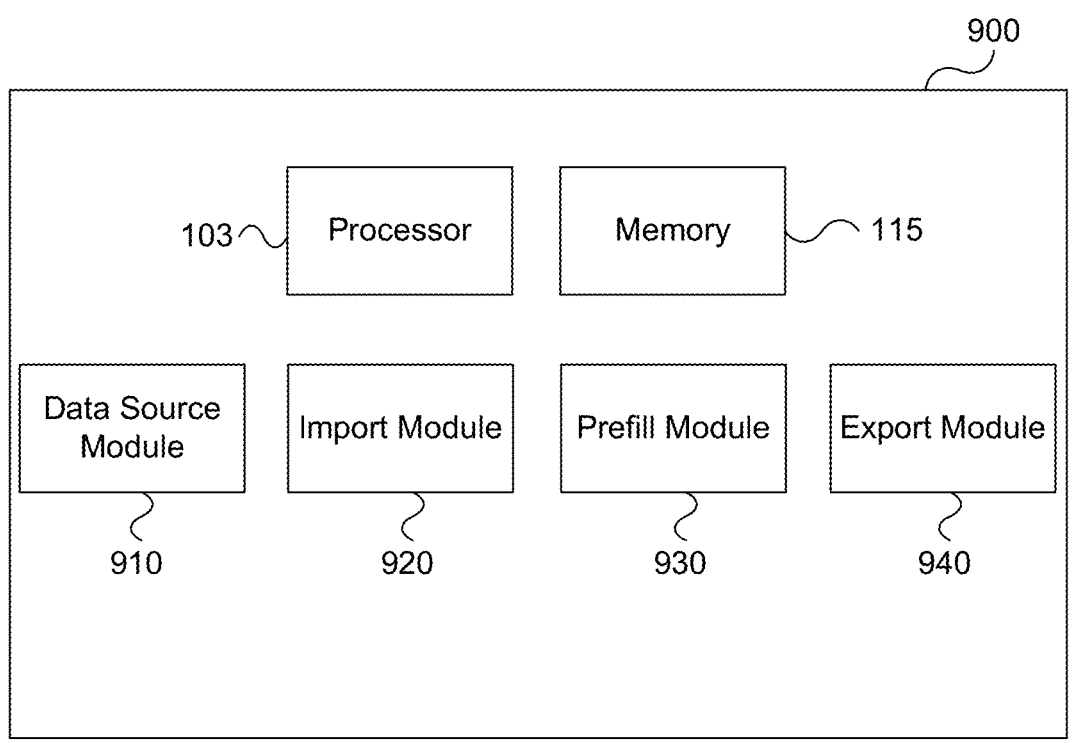
FIG. 9 illustrates a system according to one or more illustrative embodiments.

Having discussed two exemplary methods according to some embodiments, a system for transferring customer information from a first user interface to a third user interface by way of a second user interface as shown in FIG. 9 will be described.

FIG. 9 illustrates an example of a system 900 for transferring customer information from a first user interface to a third user interface by way of a second user interface. In some embodiments, system 900 may be implemented in one or more computing devices, which may include and/or incorporate one or more processors, one or more memories, and/or one or more aspects of the computing device 101 discussed above. In some instances, system 900 may include a number of different modules, subsystems, databases, and/or libraries. In some arrangements, all of the modules and subsystems included in system 900 may be included in and/or incorporated into a single computing device, while in other arrangements, each module or subsystem included in system 900 (and/or combinations thereof) may be included in and/or incorporated into a distinct and/or dedicated computing device. In addition, each of the databases and/or libraries included in system 900 may be included in and/or incorporated into the same computing device as one or more other subsystems of system 900, or, in other arrangements, may be included in and/or incorporated into distinct and/or dedicated computing devices (which, e.g., are communicatively coupled to and/or otherwise accessible to system 900 and/or its various subsystems).

As seen in FIG. 9, in some embodiments, system 900 may include a processor 103, a memory 115, a data source module 910, an import module 920, a prefill module 930, and an export module 940. This arrangement represents one illustrative configuration of system 900. In other embodiments, one or more elements of system 900 may be combined and/or additional and/or alternative subsystems may be included in addition to and/or instead of those shown in FIG. 9.

In some embodiments, data source module 910 may be configured to identify customer information associated with a first customer in a first user interface. The first user interface may be text-based user interface 220. As discussed above, text-based user interface 210 may be provided in a window, or it may be full screen. Text-based user interface 210 may be visible to the user, or it may be hidden, minimized, or otherwise occluded. Text-based user interface 210 may be initialized, such as by opening an application associated with text-based user interface 210 and logging in to said application. Data source module may receive an indication of the customer information being sought, such as a customer ID, account number, name, or other criteria related to customer information 211.

In some embodiments, import module 920 may be configured to import at least a portion of customer information 211 into a spreadsheet associated with intermediate user interface 220. Import module 920 may initiate the import in response to operation of an import data control presented by intermediate user interface 220, such as import data control 411. Customer information 211 may be automatically imported according to a first mapping 201. First mapping 201 may associate each of one or more portions of the spreadsheet with a corresponding portion of text-based user interface 210. As discussed above, first mapping 201 may utilize a referential coordinate system or key terms to identify portions of text-based user interface 210. Each portion of text-based user interface 210 identified in first mapping 201 may be associated with a portion of the spreadsheet. First mapping 201 may identify a row, column, or cell of the spreadsheet to be associated with the corresponding portion of text-based user interface 210. First mapping 201 may further utilize a lookup table to identify the proper portion of the spreadsheet corresponding to the portion of text-based user interface 210.

In some embodiments, prefill module 930 may receive user input approving or validating the imported customer information 211. Prefill module 930 may cause intermediate user interface 220 to be presented to the user such that the user may review and approve imported customer information 211. In some embodiments, the user indicates approval of the edited data by operating a populate form control 412. In some embodiments, the user's approval may be implicit based on user preferences or settings.

In some embodiments, export module 940 populates a graphical user interface 230 using the approved customer information 211. The approved customer information may be used to automatically populate a form 231 presented by graphical user interface 230 according to a second mapping 202. Second mapping 202 may associate each of one or more portions of the third user interface with a corresponding portion of the second user interface. In some embodiments, second mapping 202 may associate each of one or more fields 232 of graphical user interface 230 with a corresponding portion of the spreadsheet, as discussed above. In some embodiments, second mapping 201 may specify fields 232 of form 231 by a tag name or other ID used to identify a particular field. In some embodiments, a markup language document associated with graphical user interface 230 may be parsed to identify elements corresponding to the specified field. Second mapping 202 may identify a row, column, or cell of the spreadsheet to be associated with one or more corresponding fields 232 of graphical user interface 230. For example, a "CustomerID" column in spreadsheet 501 may be mapped to a field having an ID tag "CustomerID". Second mapping 202 may further utilize a lookup table to identify the proper portion of the spreadsheet corresponding to field 232 of graphical user interface 230.

As indicated above, these are examples of the modules, subsystems, databases, and/or other elements that may be included in system 900 in some embodiments, as well as some of the functions that may be performed (e.g., by system 900 and its various subsystems). In other embodiments, additional and/or alternative modules, subsystems, databases, and/or other elements may similarly be included, and/or other functions may be performed, in addition to and/or instead of those discussed above.

In some embodiments, techniques described herein may be utilized to automate various steps of resolving disputes related to information contained in a credit history report. More particularly, intermediate user interface 220 may be a credit report prefill tool according to some embodiments and may facilitate the automatic transfer of information from a text-based customer information application to a browser-based credit report dispute resolution system.

The credit report prefill tool may include a first mapping between the text-based customer information application and portions or fields of the credit report prefill tool. The credit report prefill tool may further include a second mapping between portions or fields of the credit report prefill tool and a form provided by the credit report dispute resolution system. The credit report prefill tool may thus automatically populate the fields of the browser-based user interface with the customer information items retrieved from the credit report prefill form.

The credit report dispute resolution system may be a subscription-based and web-based automated system that enables data furnishers and credit reporting agencies to create and respond to consumer credit history disputes. The credit report dispute resolution system may support automated credit dispute verification and automated universal dataform processing as well as a number of related processes that handle registration, subscriber code management, and reporting. An automated credit dispute verification may be initiated by a credit reporting agency on behalf of a customer and routed to the appropriate data furnisher based on the credit reporting agency and subscriber code affiliations indicated by the data furnisher. The automated credit dispute verification may be returned to the initiating credit reporting agency with any updated information relating to the customer's credit history. Automated universal dataforms may be initiated by a data furnisher to process out-of-cycle credit history updates. The credit report dispute resolution system may be used to create the automated universal dataform and route it to the appropriate credit reporting agencies based on subscriber codes specified by the data furnisher in the automated universal dataform record.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signalconducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method comprising:
   identifying customer information associated with a first customer in a first user interface, said first user interface comprising a terminal user interface;
   automatically importing at least a portion of the customer information into a second user interface according to a first mapping which associates each of one or more portions of the second user interface with a corresponding portion of the first user interface;
   receiving user input approving the customer information imported into the second user interface; and
   responsive to the approving, automatically populating one or more fields of a third user interface with the approved customer information according to a second mapping which indicates a correspondence between markup language elements associated with each of the one or more fields of the third user interface and a corresponding portion of the second user interface.

2. The method of claim 1, wherein the first mapping associates coordinates of the terminal user interface with a respective portion of the second user interface.

3. The method of claim 1, wherein:
   the automatically importing comprises storing the customer information in a spreadsheet associated with the second user interface,
   the first mapping associates each of at least one column of the spreadsheet with a corresponding portion of the first user interface, and
   the second mapping associates each of the one or more fields of the third user interface with a corresponding column of the spreadsheet.

4. The method of claim 1, wherein the second user interface stores additional customer information associated with the first customer imported from a data source other than the first user interface.

5. The method of claim 1, wherein:
   the automatically importing comprises storing the customer information in a markup document associated with the second user interface,
   the first mapping associates each of at least one element of the markup document with a corresponding portion of the first user interface, and
   the second mapping associates each of the one or more fields of the third user interface with a corresponding element of the markup document.

6. The method of claim 1, wherein the imported customer information is modified via the second user interface prior to populating the one or more fields.

7. The method of claim 1, further comprising:
   receiving user input via the second user interface editing a portion of the imported customer information; and
   updating the imported customer information within the second user interface according to the user input.

8. The method of claim 1, wherein automatically populating the one or more fields comprises parsing a markup document used to generate the third user interface.

9. The method of claim 1, wherein a form presented by the third user interface is presented within a credit report dispute resolution system and the form is populated with the approved customer information.

10. The method of claim 1, wherein the first mapping identifies a portion of the first user interface using a row, a column, and a text run length.

11. The method of claim 1, wherein the first mapping identifies a portion of the first user interface using a key word or token.

12. The method of claim 1, wherein the first mapping comprises additional instructions operative to control the first user interface to retrieve additional customer information.

13. The method of claim 1, wherein the second user interface is generated based on a markup language document, and wherein the first mapping associates an element of the markup language document with a corresponding portion of the first user interface.

14. The method of claim 1, wherein the second user interface comprises additional customer information other than the automatically imported customer information.

15. A system comprising:
   a processor;
   a memory;
   a data source module executable on the processor to identify customer information associated with a first customer in a first user interface, said first user interface comprising a terminal user interface;
   an import module executable on the processor to automatically import at least a portion of the customer information into a second user interface according to a first mapping which associates each of one or more columns of a spreadsheet associated with the second user interface with a corresponding portion of the first user interface, wherein the second user interface comprises additional customer information other than the automatically imported customer information;
   a prefill module executable on the processor to receive user input approving the customer information imported into the second user interface; and
   an export module executable on the processor to automatically populate, in response to the approving, one or more fields of a third user interface with the approved customer information according to a second mapping which indicates a correspondence between markup language elements associated with each of the one or more fields of the third user interface and a corresponding column of the spreadsheet.

16. The system of claim 15, wherein the first mapping associates coordinates of the text-based user interface with a respective column of the spreadsheet.

17. The system of claim 15, further comprising:
   receiving user input via the second user interface editing a portion of the imported customer information; and
   updating the imported customer information within the second user interface according to the user input.

18. A non-transitory computer readable medium storing instructions that, when executed by a processor, cause the processor to perform steps including:
   identifying customer information associated with a first customer in a first user interface, said first user interface comprising a terminal user interface;

automatically importing at least a portion of the customer information into a second user interface according to a first mapping which associates each of one or more portions of the second user interface with a corresponding portion of the first user interface;

receiving user input approving the customer information imported into the second user interface; and responsive to the approving, automatically populating one or more fields of a third user interface with the approved customer information according to a second mapping which indicates a correspondence between markup language elements associated with each of the one or more fields of the third user interface and a corresponding portion of the second user interface.

19. The non-transitory computer readable medium of claim 18, wherein the first mapping associates a first portion of the second user interface with more than one portion of the first user interface.

20. The non-transitory computer readable medium of claim 18 wherein the second mapping associates a first field of the one or more fields of the third user interface with more than one portion of the second user interface.

* * * * *